United States Patent [19]

Harris, Jr.

[11] 4,160,727

[45] Jul. 10, 1979

[54] METHOD AND APPARATUS UTILIZING STAGED REVERSE OSMOSIS UNITS FOR PURIFYING AND DISPENSING WATER

[75] Inventor: Robert M. Harris, Jr., Reseda, Calif.

[73] Assignee: Foremost-McKesson, Inc., San Francisco, Calif.

[21] Appl. No.: 748,285

[22] Filed: Dec. 7, 1976

Related U.S. Application Data

[63] Continuation of Ser. No. 551,671, Feb. 21, 1976, abandoned.

[51] Int. Cl.$^2$ .................. B01D 31/00; B01D 13/00
[52] U.S. Cl. .................................. 210/23 H; 210/97; 210/140; 210/248; 210/257.2; 210/259
[58] Field of Search ............... 210/23 H, 321 R, 259, 210/96 M, 97, 257 M, 258, 248, 138, 140; 261/DIG. 7; 99/283

[56] References Cited

U.S. PATENT DOCUMENTS

| | | | |
|---|---|---|---|
| 3,011,426 | 12/1961 | Mueller | 99/283 |
| 3,823,086 | 7/1974 | Schmidt | 210/321 R |
| 3,856,676 | 12/1974 | Grimme, Jr. et al. | 210/321 R |

FOREIGN PATENT DOCUMENTS 1557419  1/1969  France .................. 210/23 H

Primary Examiner—Frank A. Spear, Jr.
Attorney, Agent, or Firm—Flehr, Hohbach, Test, Albritton & Herbert

[57] ABSTRACT

Method and apparatus utilizing successive reverse osmosis stages to produce highly purified water from potable water in a manner particularly suitable for use in a coin operated vending machine. The flow rates in the reverse osmosis stages are matched so that no storage tank is required between them. Operation of the purification stages is controlled by the level of purified water in a reservoir from which it is dispensed, and the level is automatically maintained within a predetermined range. A sump pan is mounted under the remainder of the machine to catch spillage, accidental overflow from the reservoir and the reject (brine) flow from the reverse osmosis stages, a sump pump is automatically actuated when the water reaches a predetermined level in the sump pan, and a valve at the feed water inlet is closed automatically in the event that the water level gets too high in either the reservoir or the sump pan. The machine will not accept coins in the event that the water in the reservoir drops to a predetermined level or fails to meet a desired standard of purity, and means is included for adding minerals to the purified water dispensed, if desired.

29 Claims, 5 Drawing Figures

METHOD AND APPARATUS UTILIZING STAGED REVERSE OSMOSIS UNITS FOR PURIFYING AND DISPENSING WATER

This is a continuation of application Ser. No. 551,671 filed Feb. 21, 1976, now abandoned.

BACKGROUND OF THE INVENTION

This invention pertains generally to treating and dispensing of water and more particularly to a method and apparatus for producing and dispensing highly purified water.

Prior art techniques for making highly purified water (e.g. 10 parts per million total dissolved solids) from potable water (e.g. up to 1000 parts per million total dissolved solids) such as that supplied by a municipal water supply or reservoir have included filtration, carbon adsorption, deionization, distillation and reverse osmosis followed by either deionization or distillation. When reverse osmosis is combined with either deionization or distillation, a storage tank is required between the reverse osmosis unit and the other stage due to limitations on pressure and flow rates in ion exchange and distillation.

Heretofore, there have been attempts to dispense purified or demineralized water through vending machines located at supermarkets and in other areas accessible to the public. Such machines have required frequent maintenence, and leakage and spillage have made them unsuitable for use in some locations, for example, inside supermarkets or where water spillage would produce a hazardous slippery condition on the floor or ground around the machine. Moreover, the size of such machine is generally limited by space considerations and the capacity of the machine to dispense water would be severely reduced by the space occupied by the tank between purification stages.

OBJECTS AND SUMMARY OF THE INVENTION

The invention utilizes successive reverse osmosis stages to produce highly purified water from potable water in a manner particularly suitable for use in a coin operated vending machine. The flow rates in the reverse osmosis stages are matched so that no storage tank is required between them. Operation of the purification stages is controlled by the level of purified water in a reservoir from which it is dispensed, and the level is automatically maintained within a predetermined range. A sump pan is mounted under the remainder of the machine to catch spillage, waste, and reject (brine), a sump pump is automatically actuated when the water reaches a predetermined level in the sump pan, and a valve at the feed water inlet is closed automatically in the event that the water level gets too high in either the sump pan or the reservoir. The machine will not accept coins in the event that the water in the reservoir drops to the predetermined level or fails to meet a desired standard of purity, and means is included for adding minerals to the purified water dispensed, if desired.

It is in general an object of the invention to provide a new and improved method and apparatus for producing and dispensing highly purified water.

Another object of the invention is to provide a method and apparatus of the above character suitable for incorporation in a vending machine.

Another object of the invention is to provide a method and apparatus of the above character utilizing staged reverse osmosis units.

Another object of the invention is to provide a method and apparatus of the above character in which operation of the purification stages is controlled by the level of purified water in a reservoir from which the water is dispensed.

Another object of the invention is to provide a method and apparatus of the above character including means for preventing spillage or leakage of water from the unit.

Additional objects and features of the invention will be apparent from the following description in which preferred embodiments are set forth in detail in conjunction with the accompanying drawings.

DESCRIPTION OF THE PREFERRED EMBODIMENT

Figure 1:
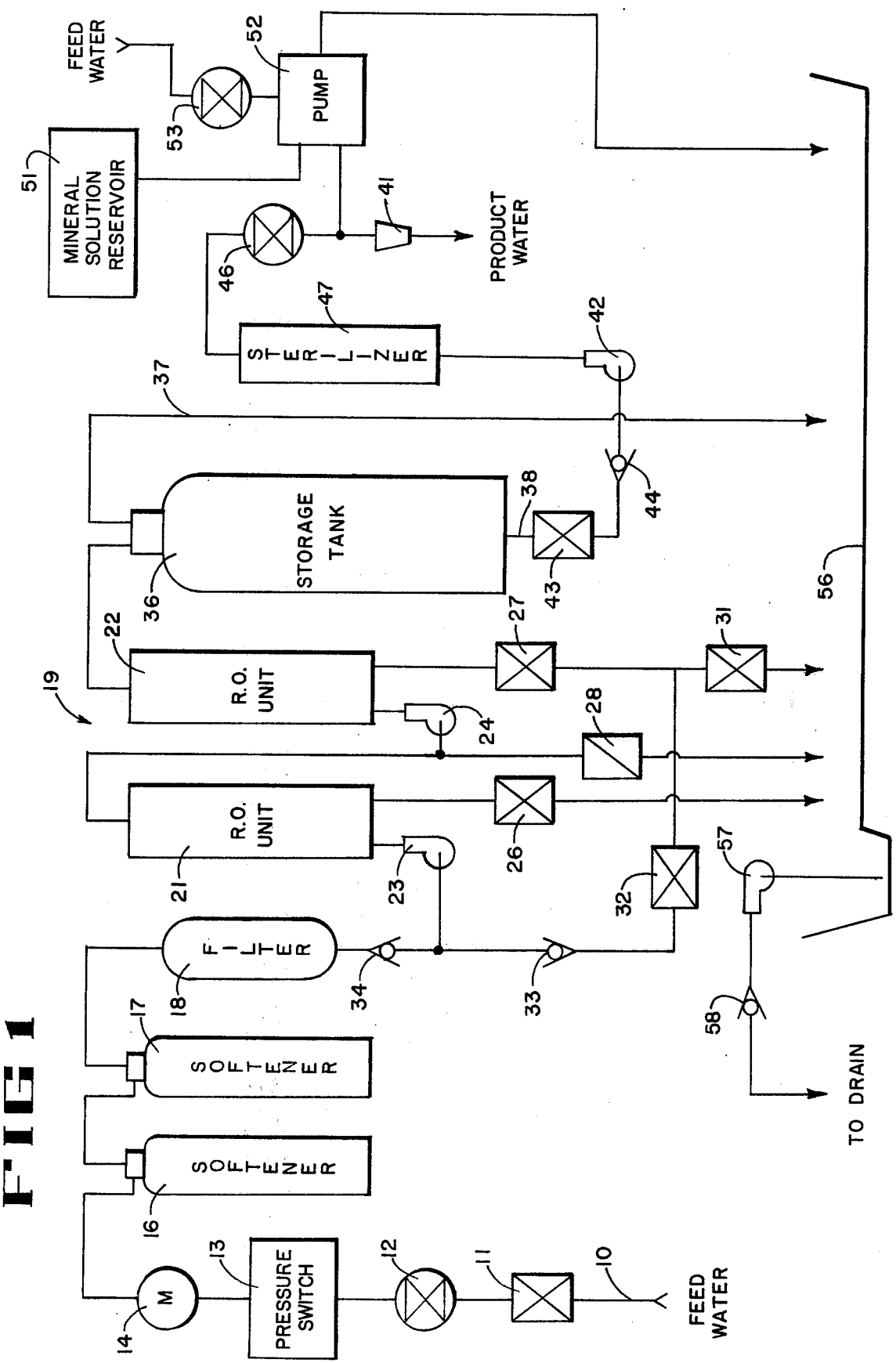
FIG. 1 is a diagramatic illustration of the flow system of one embodiment of apparatus for purifying and dispensing water according to the invention.

As illustrated in FIG. 1, the apparatus includes an inlet line 10 for connection with a source of potable water, such as ordinary city water supply lines. Such water has a purity on the order up to 1000 PPM total dissolved solids, and it is typically delivered at a pressure on the order of about 50 to 120 PSI.

Feed water from inlet line 10 passes through a manually operated gate valve 11, a solenoid operated valve 12, an adjustable pressure switch 13, and a flow meter 14. As discussed more fully hereinafter, valves 11 and 12 provide means for isolating the remainder of the apparatus from the supply line, and switch 13 provides a control signal in the event that the pressure of the feed water drops below a predetermined level, for example, 24 PSI. The flow meter is of a conventional totalizer type for indicating the volumetric flow into the apparatus.

Minerals causing "hardness" such as calcium and magnesium are removed from the feed water by water softeners 16, 17. In the preferred embodiment, the softeners are conventional cation exchange units in which calcium and magnesium in the water are replaced with sodium ions. Organic compounds are removed from the feed water by a filter 18 connected to the output of softener 17. In the preferred embodiment, the filter contains activated carbon which in addition to organic compounds, also removes residual chlorine and related compounds such as are found in pesticides.

From filter 18, the feed water passes to a purification stage 19 comprising a pair of reverse osmosis units 21, 22. These units are of conventional design, and each includes a feed water inlet, a permeate outlet, a membrane structure between the feed water inlet and the permeate outlet, and a concentrate outlet on the same side of the membrane structure as the feed water inlet.

The units utilized in the preferred embodiment have hollow fiber membranes, although other types of reverse osmosis modules can be utilized if desired. The outlet of filter 18 is connected to the feed water inlet of reverse osmosis unit 21 by a pump 23, and the permeate outlet of this unit is connected to the feed water inlet of the second unit by a pump 24. Needle valves 26, 27 are connected to the concentrate outlets of the reverse osmosis units and provide means for adjusting the rates of flow through the units. As discussed more fully hereinafter, needle valve 26 is adjusted to provide a desired osmotic pressure in unit 21, and needle valve 27 is adjusted so that the permeate from unit 21 is delivered to the feed inlet of unit 22 at substantially the same rate that it is produced by unit 21. With the pressures and flow rates balanced, no storage tank is required between the reverse osmosis units. A pressure relief valve 28 is connected to the permeate outlet of unit 21 to protect this unit in the event of a malfunction of unit 22 or pump 24.

Means is provided for recovering and recirculating the concentrate or brine from the second reverse osmosis unit, if desired. This means includes valves 31 and 32 connected to the outlet of needle valve 27 and a check valve 33 connected between valve 32 and the inlet side of pump 23. With valve 31 open and valve 32 closed, the concentrate is discharged to the waste line, but with valve 31 closed and valve 32 open the concentrate is recirculated through the reverse osmosis units. A check valve 34 in the line between filter 18 and pump 23 prevents the recovered concentrate from being directed back into the filter, should the concentrate pressure exceed the feed pressure for any reason.

The permeate outlet of the second reverse osmosis unit 22 is connected to the inlet of a storage tank or reservoir 36. The storage tank is an unpressurized vessel having an overflow outlet 37 and a product outlet 38. Purified water is delivered from the product outlet to a dispenzing nozzle 41 by a pump 42. A cock valve 43 and a check valve 44 are connected between the outlet of the tank and the inlet of the pump, and a solenoid operated valve 46 is connected between the outlet of the pump and the inlet of the nozzle.

Means is provided for sterilizing the water from tank 36 before it is dispensed. This means comprises an ultraviolet sterilizer 47 connected between the outlet of pump 42 and the inlet of valve 46. This unit is of conventional design, and in the preferred embodiment, it comprises a pair of quartz tubes through which the water flows and a pair of ultraviolet lamps to which the water in the tubes is exposed.

Means is provided for adding a predetermined amount of mineral to the purified water, if desired. This means includes a reservoir 51 for holding a concentrated mineral solution and a metering pump 52 for delivering a predetermined amount of the mineral solution to dispensing nozzle 41. In the preferred embodiment, pump 52 is a hydraulically actuated, spring return piston displacement pump to which pressurized water is applied through a solenoid operated valve 53 to actuate the pump.

A sump pan 56 is provided for collecting the concentrate discharged from reverse osmosis units 21 and 22, permeate discharged through pressure relief valve 28, overflow from tank 36, feed water discharged from mineral pump 52, and any water leaking or spilling from the remainder of the apparatus. A pump 57 removes the water from the sump pan to an external drain through a check valve 58.

Figure 2:
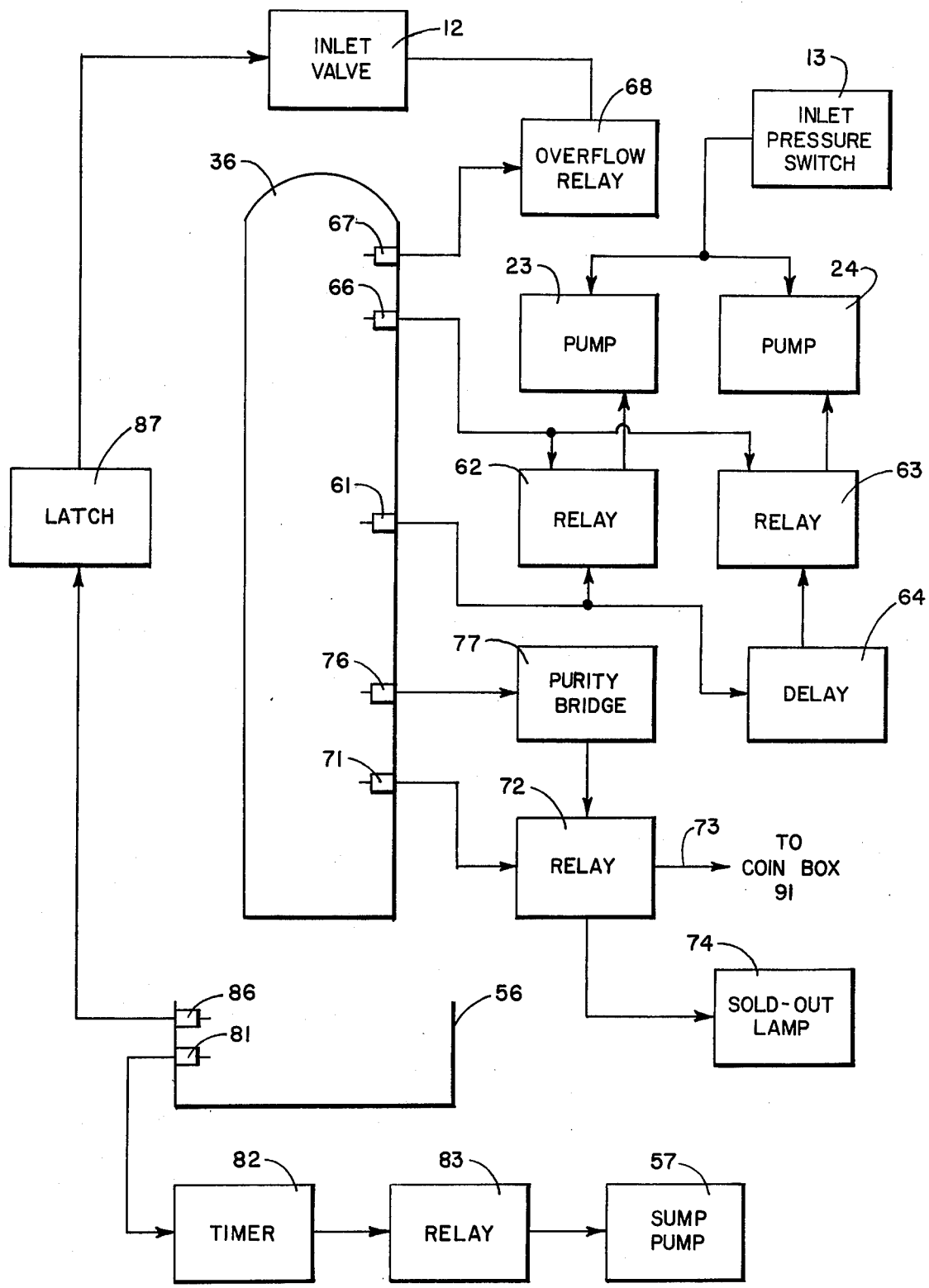
FIG. 2 is a diagramatic illustration of one portion of a control system for the apparatus of FIG. 1.

As illustrated in FIG. 2, operation of the purification portion of the apparatus is controlled by the level of the water in tank 36. In this regard, means is provided for actuating pumps 23 and 24 when the water in the tank drops to a predetermined level. This means includes a level sensor 61 such as an electromagnetic float switch mounted at the predetermined level on the side wall of the tank. Sensor 61 controls the energization of relays 62 and 63 which, in turn, control the energization of pumps 23 and 24. A delay network 64 is interposed between the sensor and relay 63 to permit pump 23 to begin working before pump 24 is energized. In the preferred embodiment, a delay on the order of 4 seconds is provided.

A second level sensor 66 is connected to relays 62 and 63 to deenergize pumps 23 and 24 when the water rises to a second predetermined level in the tank. In the preferred embodiment, sensor 66 is also an electromagnetic float switch.

The adjustable pressure responsive switch 13 is connected to pumps 23 and 24 to deenergize the pumps and prevent them from running dry in the event that the pressure of the feed water drops below a predetermined level, e.g. 24 PSI.

Means is provided for shutting off the flow of inlet feed water in the event that the water in tank 36 approaches an overflow level. This means comprises a level sensor 67 mounted on the wall of the tank above sensor 66. Sensor 67 is connected to an overflow relay 68 which is connected to inlet solenoid valve 12. When the water reaches the level of sensor 67, relay 68 energizes valve 12 to shut off the feed water. Valve 12 automatically re-opens when the water level drops below sensor 67.

The dispensing of water from tank 36 is also partly controlled by the level of the water in the tank. In this regard, a level sensor 71 is provided toward the bottom of the tank, and this sensor controls the operation of a relay 72. As long as the water level is above sensor 71, relay 72 delivers an enabling signal to the control circuits for the dispensing portion of the apparatus on a line 73. When the water level is below sensor 71, relay 72 removes the enabling signal from line 73 and causes a SOLD OUT lamp 74 to be illuminated.

Means is also provided for monitoring the purity of the water in tank 36 and preventing water from being dispensed in the event that impurities in the water exceed a predetermined level. This means includes electrodes 76 mounted in the tank and connected to a low voltage AC bridge 77. The output of the bridge is connected to relay 72, and in the event that the purity drops below the predetermined level, the enabling signal is removed from line 73 and lamp 74 is illuminated.

Operation of sump pump 57 is controlled by the level of the water in sump pan 56. For this purpose, a level sensor 81 is mounted on the sump pan and connected to a timer 82 which energizes the sump pump for a predetermined time through a relay 83. In the preferred embodiment, sensor 81 is an electromagnetic float switch, and timer 82 is arranged to keep the pump operating for a period sufficient to remove most of the water below the level of sensor 81 from the pan.

Means is also provided for preventing flooding due to overflow of the water in sump pan 56. This means includes a level sensor 86 mounted above sensor 81 and connected to a latch 87 which is connected to inlet valve 12. In the preferred embodiment, the latch comprises a silicon controlled rectifier connected in series with the operating coil of a relay, although other suitable latching devices can be utilized if desired.

Figure 3:
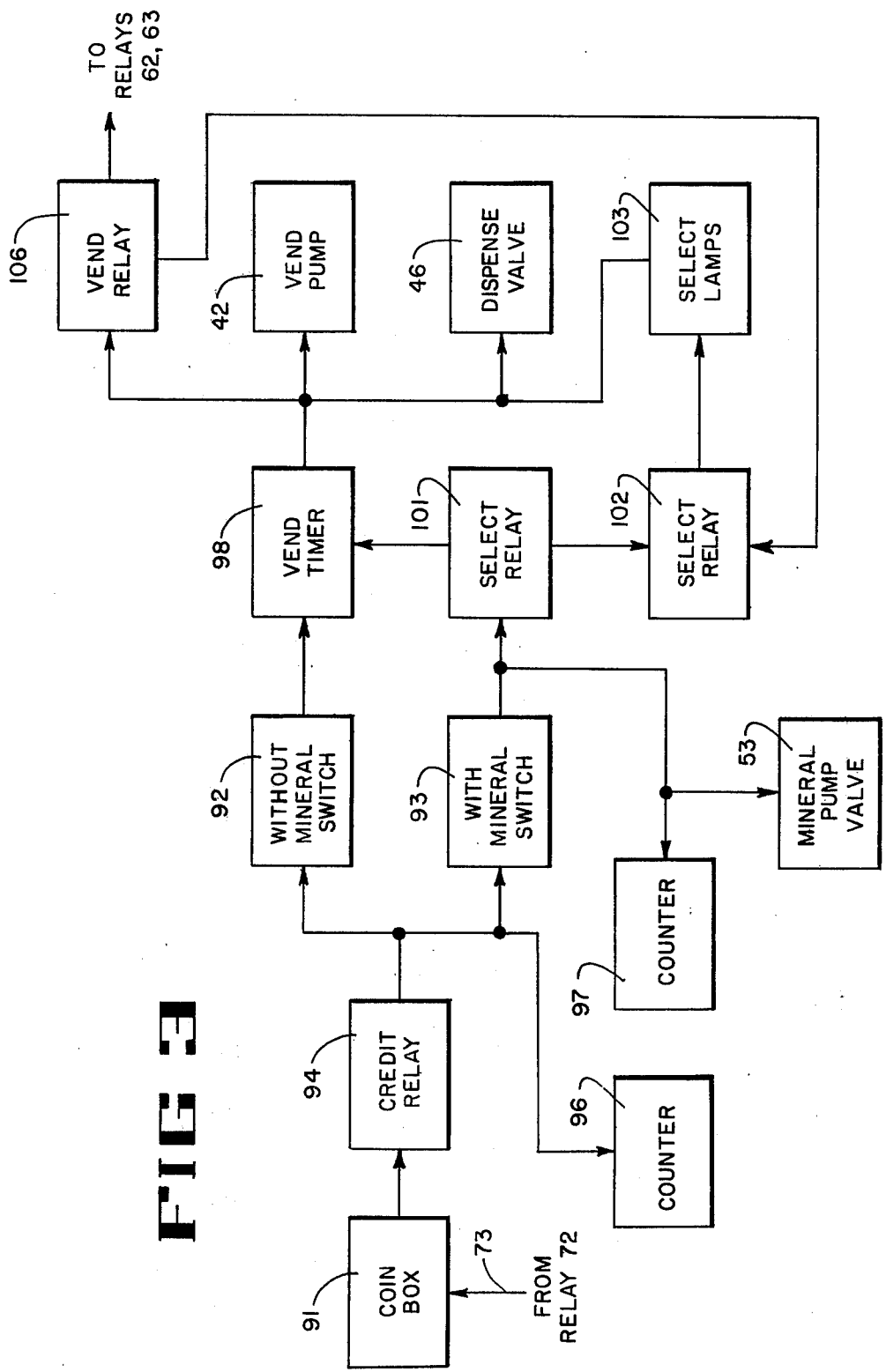
FIG. 3 is a diagramatic illustration of a second portion of the control system for the apparatus of FIG. 1.

As illustrated in FIG. 3, operation of the dispensing portion of the apparatus of FIG. 1 is controlled by a coin mechanism 91 and selector switches 92, 93 which determine whether minerals are added to the water dispensed. The coin mechanism is of conventional design, and it receives the enabling signal on line 73 from relay 72. Switches 92 and 93 are normally open pushbutton switches. When the required coin value is deposited into the coin slot, the coin mechanism actuates a relay 94 and the output of this relay is connected to selector switches 92, 93 and to counter 96 which records the total number of vends. A second counter 97 records the number of vends actuated via mineral switch 93.

The amount of water dispensed in each sale is determined by a timer 98 connected to vending pump 42 and dispensing valve 46. Timer 98 can be of conventional design, and it is triggered by the closing of either switch 92 or switch 93. The timer is adjusted in accordance with the back pressure of the system between pump 42 and dispensing nozzle 41 so that the pump remains energized and valve 46 remains open long enough to dispense the desired volume of water, for example, one gallon.

Selector switch 92 is depressed or closed when a customer does not want minerals added to the water, and the output of this switch is connected directly to time 98. Switch 93 is closed when the customer does want minerals added to the water, and the output of this switch is connected to mineral pump valve 53 and to a first selection relay 101. When energized, relay 101 delivers a trigger signal to timer 98 and to a second selection relay 102.

A pair of indicator lamps 103 is connected to the outputs of timer 98 and relay 102 to indicate whether water is being dispensed with or without minerals. The timer determines when the lamps are energized, and the relay determines which of the lamps is energized.

A relay 106 is connected to the output of timer 98 and to relays 62, 63 to prevent start-up of pumps 23, 24 during the dispensing cycle. Relay 106 is also connected to relay 102 to keep that relay energized throughout the dispensing cycle.

Figure 4:
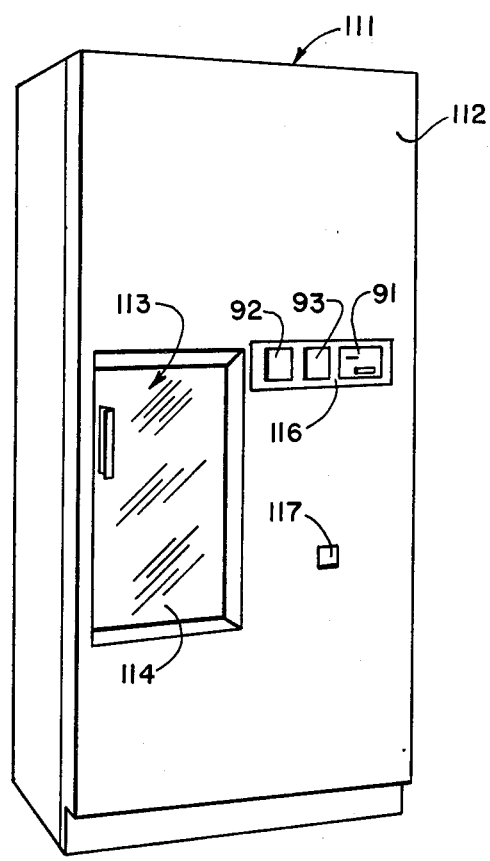
FIG. 4 is a perspective view of one embodiment of a vending machine incorporating the invention.
Figure 5:
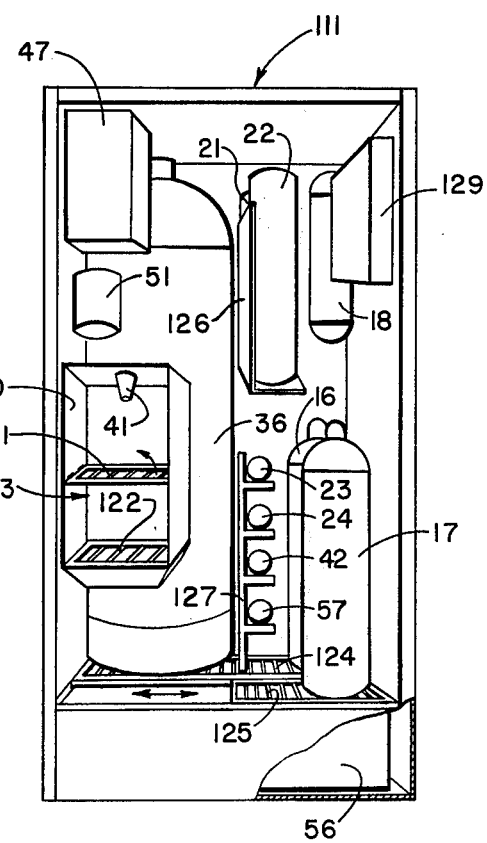
FIG. 5 is a perspective view, partly broken away, of the interior of the vending machine of FIG. 4, with the door removed.

A vending machine incorporating the invention is illustrated in FIGS. 4 and 5. The machine includes an upright cabinet 111 having a door 112 which forms the front wall of the cabinet. This door is generally kept locked, and it provides access to the inside of the machine for a serviceman or other authorized personnel. A dispensing station 113 is located toward the front of the machine and is accessible to customers through an auto-return sliding door 114 in cabinet door 112. Coin slot 91 and switches 92 93 are mounted on a control panel on door 112 and a coin return slot 117 is mounted on the door below the control panel. In this embodiment, SOLD OUT light 74 is incorporated in the coin slot panel, and selector lamps 103 are incorporated in switches 92 and 93. The remainder of the apparatus of FIGS. 1–3 is located inside the cabinet.

Dispensing station 113 comprises a compartment 121 with an open front mounted on a side wall of cabinet 111 behind door 114. Dispensing nozzle 41 is mounted in the upper wall of compartment 120, and two container supporting grills 124 and 125 are provided in the lower portion of the compartment. Storage tank 36 is mounted in an upright position behind the dispensing compartment and stands on grill 124. Ultraviolet sterilizer 47 and mineral solution reservoir 51 are mounted on the side wall of the cabinet above the dispensing compartment and in front of the storage tank.

Reverse osmosis units 21, 22 are mounted on a mounting bracket 126 supported by the rear wall of the cabinet. All pumps 57, 42, 24, and 23 are mounted onto a vertical bracket 127 attached to floor grill 124. The vertical bracket 127 is shock mounted to the rear wall of the cabinet and water softeners 16, 17 are placed onto supporting grills 124, 125. Filter 18 is mounted in the rear corner area of the cabinet above the water softeners, and the relays and other electrical components are mounted in a junction box 129 on the side wall above the softeners. Sump pan 56 is located toward the bottom of the cabinet and below dispensing compartment 121 and the other water carrying components of the machine to collect any spillage therefrom.

Operation and use of the apparatus, and therein the method of the invention can now be described. It is assumed that inlet line 10 is connected to a pressurized source of feed water having a purity on the order of up to 1000 PPM total dissolved solids. Needle valve 26 is adjusted to provide sufficient brine flow from reverse osmosis unit 21 to prevent excessive build-up of salt at the membrane, and needle valve 27 is adjusted to provide a pressure balance at the inlet and discharge of pump 24. Initially, it is assumed that valve 32 is closed so that concentrate or brine from reverse osmosis unit 22 is discharged to the waste line.

As long as the water level in tank 36 remains between sensors 61 and 66, pumps 23 and 24 are deenergized and only a small amount of water passes through the processing stages due to the pressure of the feed water at the inlet.

If the water in tank 36 drops to the level of sensor 61, relay 62 energizes pump 23, and 4 seconds later relay 63 energizes pump 24. As the feed water passes through softeners 16 and 17, sodium is exchanged for calcium and magnesium ions in the water, and as the water passes through filter 18, organic compounds and residual chlorine are removed. The first reverse osmosis unit removes greater than 90% of the total dissolved solids in the water, and the second reverse osmosis unit further reduces the impurities to a level less than 10 PPM total dissolved solids, with less than 1.0 PPM chlorides. Concentrate or brine from the reverse osmosis units is discharged to sump pan 56 from which it is automatically removed by pump 57 when it reaches the level of sensor 81.

When the level of the water in tank 36 reaches the level of sensor 66, pumps 23 and 24 are deenergized to interrupt the purification process. In the event that the water level continues rising to the level of sensor 67, solenoid valve 12 is energized to shut off the feed water and prevent flooding of the machine. When the water drops back below the level of sensor 67, the solenoid valve is deenergized, and the feed water flow is restored automatically.

Solenoid valve 12 will also close to shut off the feed water in the event that the water in sump pan 56 rises to the level of sensor 86. In this case, however, the valve is held closed by latch 87, and the feed water remains turned off until the latch circuit is reset manually.

When a customer deposits the required change in coin slot and depresses one of the selector switches, timer 98 is actuated and energizes vending pump 42 and dispensing valve 46 to dispense a predetermined amount of purified water from tank 36 through nozzle 41. If the customer depresses switch 92, he receives the purified water without additional minerals, and the appropriate lamp 103 indicates this selection.

If the customer desires minerals added to the purified water, he depresses switch 93, and valve 53 is actuated. This valve opens briefly, applying the pressure of the feed water to pump 52, and this pump delivers a reassured amount of mineral solution from reservoir 51 to the dispensing nozzle. The feed water applied to pump 52 by valve 53 is discharged to sump pan 56.

In the event that the water in tank 36 drops to the level of sensor 71, coin box 91 will not accept coins and SOLD OUT light 74 will be illuminated. When the water level is restored, relay 72 is automatically reset, turning off the SOLD OUT light and enabling the coin box to receive coins again.

Likewise, if the purity of the water in tank 36 drops below the predetermined level, the coin box is disabled and the SOLD OUT light is turned on. When the purity is restored, relay 72 turns off the SOLD OUT light and again enables the coin box to receive coins.

In the event that the pressure of the feed water in line 10 drops below a predetermined level such as 24 PSI, pressure switch 13 overrides the sensors in tank 36 and deenergizes pumps 23 and 24 to prevent them from running dry. Switch 13 is automatically reset upon restoration of the feed water pressure.

In the event of a failure of pump 24, pressure relief valve 28 will discharge the permeate from reverse osmosis unit 21 to sump pan 56, thereby, preventing damage to the unit.

The concentrate of brine from reverse osmosis unit 22 is 5-to-11 times less salty than the inlet feed water, and this brine can be recovered and recirculated by closing valve 31 and opening valve 32. Recirculating the brine in this manner can, by dilution, improve the purity of the product water, reduce waste and conserve softener capacity by reducing the amount of water passing through softeners 16 and 17.

EXAMPLE

In one specific example, the feed water applied to inlet line 10 and mineral pump 52 comes from a municipal supply and has a pressure on the order of 24 to 120 PSI. The membranes in the reverse osmosis units have a porosity on the order of 0.01 to 0.03 micron and with potable water require a minimum brine flow greater than 10% of feed flow to prevent excessive build up of salt at the membranes. Valve 26 is adjusted initially to provide a brine flow from the first reverse osmosis unit 21 of greater than 10% of feed flow, which corresponds to a pressure on the order of 200 to 250 PSI at the discharge of pump 23. Valve 27 is then adjusted to provide a brine flow from the second reverse osmosis unit 22 on the order of 0.1 to 0.25 GPM, with a minimum pressure on the order of 130 PSI at the discharge of pump 24. As the reverse osmosis units are used and salt builds up at the membrane, valves 26 and 27 are adjusted periodically to maintain the desired flow rates. When the flow rates can no longer be maintained within a safe pressure differential, the units are removed for shop cleaning, and a clean set is installed. Pressure responsive switch 13 is set to shut the pumps off if the inlet feed water pressure drops to a level on the order of 24 PSI, and pressure relief valve 28 is set to open in response to a pressure on the order of 48 to 49 PSI.

In the preferred embodiment, storage tank 36 has a capacity on the order of 37 gallons, and with the values given in the foregoing example, the reverse osmosis units produce purified water at a rate on the order of 0.4 to 0.6 GPM at a temperature on the order of 77° F. For temperatures below 77° F. the flow rate decreases by about 1 percent per degree, and for temperatures 77° F. it increases by about 1 percent per degree.

The invention has a number of important features and advantages. The staged reverse osmosis units provide an efficient method of making highly purified water from potable water without an intermediate storage tank. The operation of the purification portion of the system is controlled by the level of the water in the storage reservoir, and the system will continue to dispense water as long as the level remains in the storage tank even though there is a problem in another section of the machine. Waste water is automatically disposed of through the sump pan, and safety measures are included to prevent overflow from the sump pan and flooding of the machine.

It is apparent from the foregoing that a new and improved method and apparatus for purifying and dispensing water have been provided. While only the preferred embodiments have been described, as will be apparent to those familiar with the art, certain changes and modifications can be made without departing from the scope of the invention as defined by the following claims.

What is claimed is:

1. In apparatus for purifying and dispensing water: first and second reverse osmosis units each having a feed water inlet, a permeate outlet, a membrane structure between the feed water inlet and the permeate outlet, and a concentrate outlet on the feed water inlet side of the membrane structure; means including a first pump for delivering feed water under pressure to the feed water inlet of the first reverse osmosis unit; a second pump connected between the permeate outlet of the first reverse osmosis unit and the feed water inlet of the second such unit for delivering permeate directly from the first unit to the second unit as the permeate is produced by the first unit, a storage tank connected to the permeate outlet of the second reverse osmosis unit; means for dispensing water from the storage tank; first level responsive means for actuating the pumps when the water drops to a first predetermined level in the tank; second level responsive means for deactuating the pumps when the water rises to a second predetermined level in the tank; a sump pan positioned below the reverse osmosis units, storage tank and dispensing means for catching water spilled therefrom; a sump pump for pumping water from the sump pan to a drain; and level responsive means for actuating the sump pump in the event that the water in the sump pan reaches a predetermined level.

2. The apparatus of claim 1 further including additional level responsive means for shutting off the delivery of feed water in the event that the water in the tank rises to a predetermined level above the second predetermined level.

3. The apparatus of claim 1 further including additional level responsive means for preventing water from being dispensed in the event that the water in the tank drops to a predetermined level below the first predetermined level.

4. The apparatus of claim 1 further including pressure responsive means for deactuating the pumps in the event that the pressure of the feed water drops to a predetermined level.

5. The apparatus of claim 1 further including means for monitoring the purity of the water in the tank and preventing dispensation of water in the event that impurities in the water reach a predetermined level.

6. The apparatus of claim 1 further including additional level responsive means for shutting off the feed water in the event that the water in the sump pan rises to a predetermined level above the level at which the sump pump is actuated.

7. The apparatus of claim 1 further including softener means for removing minerals from the feed water before said water is delivered to the first pump.

8. The apparatus of claim 1 wherein the first level responsive means includes means for actuating the first pump a predetermined time before the second pump is actuated.

9. The apparatus of claim 1 wherein the means for dispensing water is coir operated.

10. The apparatus of claim 1 further including means for adding a predetermined amount of mineral to the water dispensed from the tank.

11. The apparatus of claim 1 further including means for connecting the concentrate outlet of the second reverse osmosis unit to the feed water inlet of the first reverse osmosis unit to recirculate concentrate from the second reverse osmosis unit.

12. In a process for purifying and dispensing water using first and second reverse osmosis units with no means for storing water therein, the steps of: delivering water under pressure to the feed water inlet of the first reverse osmosis unit, delivering permeate directly from the first reverse osmosis unit to the feed water inlet of the second reverse osmosis unit as the permeate is produced by the first unit, with no storage of permeate between the units, delivering permeate from the second reverse osmosis unit to a storage tank, dispensing water from the tank, interrupting operation of the reverse osmosis units in the event that the water in the tank rises to a first predetermined level, resuming operation of the reverse osmosis units in the event that the water in the tank drops to a second predetermined level, collecting water spillage from the reverse osmosis units and tank in a sump pan positioned beneath the same, and pumping the water from the sump pan to a drain in the event that the water in the pan reaches a predetermined level.

13. The process of claim 12 further including the step of shutting off the feed water to the first osmosis unit in the event that the water in the tank rises to a predetermined level above the first predetermined level.

14. The process of claim 12 further including the step of inhibiting the dispensing of water in the event that the water in the tank drops to a predetermined level below the second predetermined level.

15. The process of claim 12 further including the steps of monitoring the purity of the water in the tank and inhibiting the dispensing of water in the event that impurities in the water reach a predetermined level.

16. The process of claim 12 further including the step of interrupting the operation of the reverse osmosis units in the event that the pressure of said feed water drops to a predetermined level.

17. The process of claim 12 further including the step of shutting off the feed water to the first osmosis unit in the event that the water in the sump pan rises to a predetermined level above the level at which water is pumped from the pan.

18. The process of claim 12 further including the step of softening the feed water before it is delivered to the first reverse osmosis unit to prevent precipitation and scaling.

19. The process of claim 12 wherein the operation of the first osmosis unit is initiated a predetermined time before the operation of the second reverse osmosis unit.

20. The process of claim 12 further including the step of adding a predetermined amount of mineral to the water dispensed from the tank.

21. The process of claim 12 further including the step of delivering concentrate from the second reverse osmosis unit to the feed water inlet of the first unit to reprocess the same.

22. In a water purifying and dispensing machine: a cabinet, water inlet means for connection to a source of feed water, first and second reverse osmosis units, a first pump for delivering feed water from the inlet means to the feed water inlet of the first reverse osmosis unit, a second pump for delivering permeate from the first reverse osmosis unit to the feed water inlet of the second reverse osmosis unit, a reservoir within the cabinet for holding purified water from the second reverse osmosis unit, a dispensing station accessible externally of the cabinet, coin operated means for delivering water from the reservoir to the dispensing station, a sump pan toward the bottom of the cabinet positioned for catching water from other portions of the machine, a pump for delivering water from the sump pan to an external drain, and level responsive means for actuating the pump in the event that the water in the sump pan reaches a predetermined level.

23. The machine of claim 22 wherein the means for actuating the pump includes a timer for actuating the pump for a predetermined time after the water reaches the predetermined level.

24. The machine of claim 22 further including level responsive means for shutting off the flow of feed water to the machine in the event that the water in the sump pan reaches a predetermined level higher than the level at which the pump is actuated.

25. The machine of claim 22 further including level responsive means for preventing the acceptance of coins and the delivery of water to the discharge station in the event that the level of the water in the reservoir drops to a predetermined level.

26. The machine of claim 22 further including level responsive means for shutting off the flow of feed water to the machine in the event that the level of the water in the reservoir rises to a predetermined level.

27. The machine of claim 22 further including first level responsive means for actuating the means for processing feed water when the level of the water in the reservoir drops to a first predetermined level and second level responsive means for deactuating the means for processing feed water when the level of water in the reservoir rises to a second predetermined level.

28. The machine of claim 22 wherein the pumping rates of the first and second pumps are adjusted such that the permeate is delivered to the second unit at substantially the same rate that said permeate is produced by the first unit.

29. The machine of claim 22 wherein concentrate from at least one of the reverse osmosis units is discharged to the sump pan.

* * * * *